T. & G. B. BURDITT.
Potato-Digger.
No 64,627.
Patented May 14, 1867.
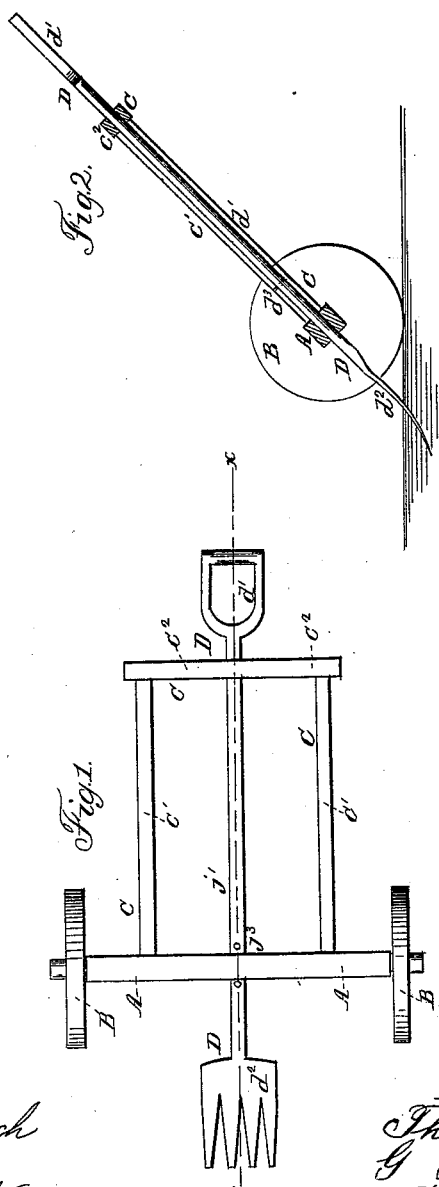

United States Patent Office.

THOMAS AND GEORGE B. BURDITT, OF DANSVILLE, NEW YORK.

Letters Patent No. 64,627, dated May 14, 1867.

IMPROVEMENT IN POTATO-DIGGER.

*The Schedule referred to in these Letters Patent and making part of the same.*

TO ALL WHOM IT MAY CONCERN:

Be it known that we, THOMAS BURDITT and GEORGE B. BURDITT, of Dansville, in the county of Livingston, and State of New York, have invented a new and useful Improvement in Potato-Digger; and we do hereby declare that the following is a full, clear, and exact description thereof, which will enable others skilled in the art to make and use the same, reference being had to the accompanying drawings, forming part of this specification, in which—

Figure 1 is a top view of our improved potato-digger.

Figure 2 is a vertical longitudinal section of the same taken through the line $x$ $x$, fig. 1.

Similar letters of reference indicate like parts.

Our invention has for its object to furnish a simple and convenient hand machine for digging potatoes, by the use of which the operation may be greatly facilitated; and it consists in the combination of a fork, frame, axle, and wheels with each other, as hereinafter more fully described.

A is the axle, upon the ends of which are placed the wheels B, in the ordinary manner. The axle A should be of such a length that the wheels B may run between the rows of potatoes when the machine is being operated. To the axle A is securely attached the frame C, consisting of the side-bars $c^1$ and the cross-bar $c^2$, which connects the outer ends of the said side-bars $c^1$, as shown in fig. 1. D is the fork, the handle $d^1$ of which passes through and works in a hole made through the axle A, and cross-bar $c^2$ of the frame C, as shown in figs. 1 and 2. The fork head $d^2$ and handle $d^1$ are made in the usual form and manner, and the said handle is kept from being drawn out of the frame C by the fork head $d^2$ coming in contact with the lower side of the axle A, and it is kept from being pushed too far through said frame by the stop pin $d^3$, which comes in contact with the upper side of the said axle A. In using the machine, it is pushed forward to the hill to be dug, and the prongs of the fork are pushed into the ground by means of the handle $d^1$, the leverage of the frame and axle assisting the operation. Then, by depressing the end of the handle, and at the same time pushing the machine forward, the potatoes are lifted out of the ground, the axle A acting as a fulcrum to the fork handle.

We claim as new, and desire to secure by Letters Patent—

The arrangement of the fork D with the axle A, bar $C^2$ of the frame C, and wheels B, when all are constructed and operating as herein set forth.

THOS. BURDITT,
GEORGE B. BURDITT.

Witnesses:
D. L. KINGSLEY,
L. H. BENJAMIN.